(12) United States Patent
Dubreil et al.

(10) Patent No.: US 6,723,366 B1
(45) Date of Patent: Apr. 20, 2004

(54) USE OF PUROINDOLINE FOR PREPARING BISCUITS

(75) Inventors: Laurence Dubreil, Le Loroux Bottereau (FR); Anne Le Guillou, Fresnes (FR); Aliette Verel, Bievres (FR)

(73) Assignee: Lu France, Ris Orangis (FR)

( * ) Notice: Subject to any disclaimer, the term of this patent is extended or adjusted under 35 U.S.C. 154(b) by 0 days.

(21) Appl. No.: 09/831,497

(22) PCT Filed: Nov. 10, 1999

(86) PCT No.: PCT/FR99/02763

§ 371 (c)(1), (2), (4) Date: Aug. 8, 2001

(87) PCT Pub. No.: WO00/27209

PCT Pub. Date: May 18, 2000

(30) Foreign Application Priority Data

Nov. 10, 1998 (FR) ............................................. 98 14135

(51) Int. Cl.$^7$ ................................................ A21D 13/00
(52) U.S. Cl. ........................ 426/549; 426/94; 426/496; 426/653; 426/656
(58) Field of Search .......................... 426/94, 656, 549, 426/653, 496

(56) References Cited

PUBLICATIONS

Dubreil L. et al. (1998) "Effect of Puroindolines on the breadmaking properties of wheat flour" *Cereal Chemistry* 75(2):222–229.

*Primary Examiner*—Lien Tran
(74) *Attorney, Agent, or Firm*—Morgan Lewis & Bockius LLP

(57) ABSTRACT

The present invention relates to the use of puroindolines as additives in biscuit manufacture. More specifically, the present invention relates to the use of puroindolines added to biscuit flour in order to increase the firmness of a biscuit.

15 Claims, 4 Drawing Sheets

USE OF PUROINDOLINE FOR PREPARING BISCUITS

The invention relates to the use of puroindolines as additive in biscuit manufacture.

Puroindolines are proteins which are present in wheat grain and which have the capacity to interact with lipids. Two isoforms of puroindolines, respectively called puroindoline a and puroindoline b, have been characterized. They are basic proteins (pI ~10) of low molecular weight (about 13 kDa); they comprise 10 cysteine residues, forming 5 disulfide bridges, and a domain rich in tryptophan residues [BLOCHET et al., in: "Gluten Proteins 1990"; (BUSHUK W. and TKACHUK R., eds), AACC, St Paul Minn., pp 314–325 (1991); BLOCHET et al., FEBS Lett., 329: 336–340, (1993).

Moreover, a recent publication [GIROUX and MORRIS, Proceedings of the National Academy of Sciences, vol. 95 p. 6262–6266, (1998)] indicates that the protein called friabilin, considered as a biochemical marker for wheat grain hardness [GREENWELL and SCHOFIELD, Cereal Chem., 63, 369–380 (1985)], is a heterodimer of puroindolines a and b which is involved in controlling the hardness of the endosperm.

Puroindolines possess specific surfactant properties linked to their high affinity for lipids; they have in particular a high foaming power which is increased in the presence of polar lipids [DUBREIL et al., J. Agric. Food Chem., 45: 108–116 (1997); WILDE et al., J. Agric. Food Chem., 41, 1570–1576 (1993)]. It has thus, for example, been shown that the addition of puroindoline made it possible to restore the foaming properties of beer supplemented with stearic acid, phospholipids or triglycerides [CLARK et al., J. Inst. Brew. 100, 23–25 (1994)], or those of egg white supplemented with oil [HUSBAND et al., in: "Food Macromolecules and Colloids" (DICKINSON E. and LODENT D., eds), Royal Society of Chemistry, London, pp. 285–296, (1995)].

Recent work relating to the potential applications of the properties of puroindolines in the context of the manufacture of bread shows that the addition of a small quantity of puroindoline (0.1% relative to the weight of the flour) considerably modifies the rheological properties of the dough and the structure of the bread crumb [DUBREIL et al., Cereal Chem. 75, 2: 222–229, (:998)]. however, the effect of puroindolines on the volume of the final product after baking varies markedly according to the baking quality of the flour used (which is linked for a large part to its glutenin composition). When puroindolines are added to flour with good baking quality, a reduction of the order of 10% in bread volume (in other words an increase in its density) is observed compared with bread made without addition of puroindolines; this decrease in volume reaches 20% if flour of poor baking quality is used. On the other hand, if puroindolines are added to flour of average baking quality (resulting from the mixing of the above two), an increase in bread volume of the order of 20% is observed.

The inventors have undertaken the study of the effect of puroindolines on preparations which are more complex than bread dough, such as the doughs normally used in pastry and biscuit manufacture.

They have thus observed that the addition of puroindoline during the preparation of biscuits induced a significant effect on the texture and/or the density of the finished product, and that it was possible to independently control these two parameters.

The subject of the present invention is the use of puroindoline as additive which makes it possible to control the texture and/or the density of a biscuit.

BRIEF DESCRIPTION OF THE DRAWINGS

FIG. 1 displays the results of trials comparing the density of hard biscuits made from flour containing endogenous puroindolines supplemented with defined amounts of puroindolines versus the control group of flour containing endogenous puroindolines supplemented with defined amounts of ovalbumin. The open square (□) represents the quantity of purified puroindolines added to the flour and the darkened circle (●) represents the quantity of ovalbumin added to the flour.

FIG. 2 displays the results of trials comparing the density of hard biscuits made from flour containing no endogenous puroindolines supplemented with 0.2% of puroindolines (▩) versus the control group of either flour containing no endogenous puroindolines supplemented with 0.2% of ovalburin (▨) or flour alone (□).

FIG. 3 displays the results of trials comparing the density of soft biscuits made from either a) flour containing no endogenous puroindolines (□), b) flour containing no endogenous puroindolines supplemented with puroindolines (0.1% by weight) (▩), or c) flour containing 0.1% of endogenous puroindolines (▨).

FIG. 4 represents the variation of the mean force ($F_{mean}$) over time for the soft biscuits obtained from the various flours tested: flour containing 0.1% of endogenous puroindolines (▲); flour without endogenous puroindolines (♦); and flour without endogenous puroindolines supplemented with 0.1% (by weight relative to the weight of the flour) of purified puroindolines (■).

FIG. 5 displays the results of trials comparing the density of puff biscuits made from either a flour containing no endogenous puroindolines (□) or flour containing no endogenous puroindolines supplemented with purified puroindolines (0.1% by weight relative to the weight of the flour) (▩).

FIG. 6 represents the variation in the mean force ($F_{mean}$) during storage for the puff biscuits made from either a flour containing no endogenous puroindolines (♦) or flour containing no endogenous puroindolines supplemented with purified puroindolines (0.1% by weight relative to the weight of the flour) (■).

FIG. 7 displays the results of trials comparing the density of puff biscuits containing 3% of rapeseed oil made from either a flour containing no endogenous puroindolines (□) or flour containing no endogenous puroindolines supplemented with purified puroindolines (0.1 % by weight relative to the weight of the flour) (▩).

FIG. 8 represents the variation in the mean force ($F_{mean}$) during storage for the puff biscuits containing 3% of rapeseed oil made from either a flour containing no endogenous puroindolines (♦) or flour containing no endogenous puroindolines supplemented with purified puroindolines (0.1% by weight relative to the weight of the flour) (■).

Figure 1:
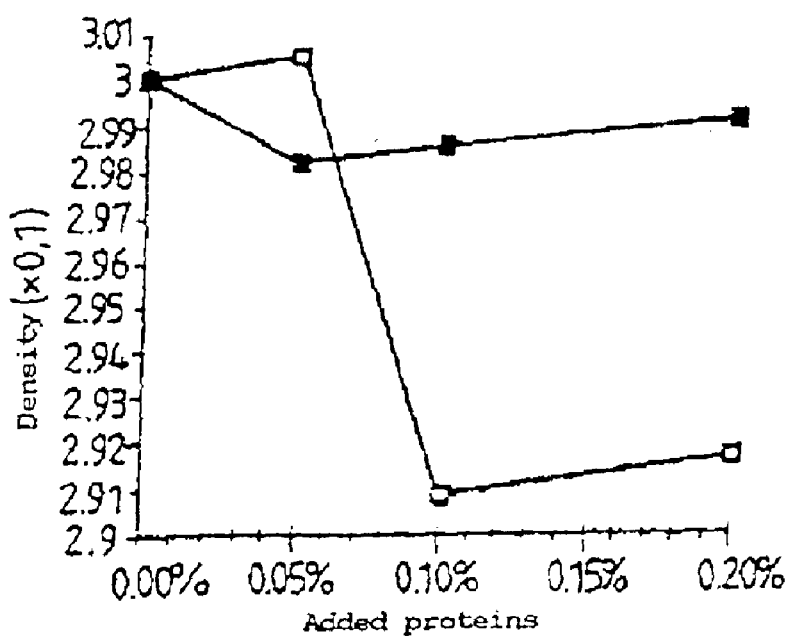
FIG. 1.

For the purposes of the present invention, the term "puroindoline" is understood to mean not only the wheat puroindolines a and b mentioned above, but also any protein or any peptide possessing functional and structural characteristics similar to those of said wheat puroindolines, and in particular any protein consisting of at least one polypeptide chain comprising at least 8 cysteine residues involved in disulfide bridges, and a tryptophan-rich domain, and possessing surfactant properties similar to those of said wheat puroindoline.

This includes in particular any natural or recombinant protein consisting of at least one polypeptide chain having the sequence of one of the allelic variants or isoforms of wheat puroindolines, or of homologous proteins present in other cereals such as oats, barley, triticale and rye, or of at least one polypeptide chain comprising at least the portions characteristic of said sequence, and which are necessary for the functional properties of puroindolines, as defined above.

These puroindolines may be used in the form of monomers as well as in the form of homomeric or heteromeric assemblies.

For the purposes of the present invention, the term "biscuit" is understood to mean any product obtained by baking a mixture, generally in the form of dough, comprising, in addition to flour obtained from cereal(s), other ingredients providing proteins, carbohydrates and/or lipids; this may include for example proteins of animal origin such as egg or milk proteins, and the like, proteins of plant origin such as soybean proteins, and the like, sugar, fatty substances of animal or plant origin. The dough is prepared from said ingredients according to any of the conventional techniques used in biscuit manufacture, which are known per se; it is thus possible, for example, to prepare a dough which is laminated, or formed by a rotary press, (so as to obtain hard biscuit-type products), a leavened dough so as to obtain cake-type products), a puff dough (so as to obtain genoese-type products), a fermented dough so as to obtain "cracker" type products, and the like. It is also possible to prepare a biscuit by carrying out all or part of the mixing, kneading and baking of the ingredients in a cooker-extruder.

Earlier work in the bakery sector mentioned above has shown that the addition of puroindolines to flours free of endogenous puroindolines resulted in an increase in the density, and therefore a decrease in the volume of the bread [DUBREIL et al., publication cited above (1997)]. It could therefore be assumed that the use of these same flours, supplemented with puroindolines, in biscuit manufacture would result in similar effects.

However, the inventors have observed, surprisingly, that the addition of puroindoline in the context of the preparation of biscuits only resulted in an increase in density in the specific case of puff biscuits prepared from a dough with a high content (that is to say greater than 7%) of fat, and could, in this case, be counterbalanced by the addition of emulsifiers. In the other cases, a decrease in density is on the contrary observed; moreover, it is observed that the addition of puroindolines results in all cases in an increase n the firmness of soft biscuits and of puff biscuits.

The effects of the use of puroindoline may be modulated according to the water content of the dough and/or its fat content and/or the quantity of emulsifier which it contains.

The decrease in density induced by the addition of puroindolines is for example lower in the case of the products obtained from a dough containing only a small amount of water (laminated hard biscuits for example).

The effect on the decrease in density also becomes less important when the content of fatty substances increases; as indicated above, for a high content of fatty substances, by contrast, an increase in density is observed in the case of puff biscuits.

However, in puff biscuits containing fat and puroindolines, the decrease in density is promoted by the addition of emulsifiers such as lecithin, mono- and diglycerides of fatty acids, acetic, lactic, citric or tartaric esters of mono- and diglycerides of fatty acids, mono- and diacetyl tartaric esters of mono- and diglycerides of fatty acids, mixed acetic and tartaric esters of mono- and diglycerides of fatty acids, sucroesters of fatty acids, polyglyceric esters of fatty acids, 1,2-propanediol esters of fatty acids, sodium 2-stearoyllactylate, calcium 2-stearoyl-lactylate. The emulsifiers make it possible to counterbalance the effect of a high content of fatty substances which are likely to trap the puroindolines.

In accordance with the invention, said puroindoline may for example be used:

to reduce the density of a puff biscuit obtained from a dough whose fat content is less than or equal to 4% of the total weight of the dough;

to reduce the density of a hard or soft, non-puff dough biscuit obtained from a dough whose fat content is between 2% and 30%, preferably between 2 and 20%, in the case of a hard biscuit, of the total weight of the dough;

to increase the firmness of a soft or puff dough biscuit; this increase in firmness contributes in particular to the obtaining of a feeling of melting in the mouth, which is appreciated by consumers.

Puroindoline induces a decrease in density greater than that observed, under the same conditions, with products normally used for reducing the density of biscuits, such as ovalbumin; it can therefore be advantageously used as a replacement for all or some of these products, or of ingredients containing them, in particular eggs. The effect on the reduction in density will be all the more marked as the reduction in the quantity of eggs causes a decrease in the total content of fatty substances in the finished product. In addition, since eggs constitute a highly variable raw material in terms of quality, their replacement with puroindoline therefore allows, for the same density, better reproducibility of the finished product.

The addition of puroindoline can also make it possible to improve a flour of poor biscuit-making quality, and to obtain from it biscuits of similar density to those obtained from a flour of good biscuit-making quality.

For the use of the present invention, puroindoline may be added in an amount of 0.02 to 5%, preferably 0.05 to 2% of the dry weight of the flour used for the preparation of the biscuit, according to the initial puroindoline content of the flour, and the final content which it is desired to obtain.

It is possible to use a purified puroindoline preparation (containing a single isoform or a mixture of isoforms); it is also possible to use a cereal fraction (for example gluten or starch) enriched with puroindoline.

The flours previously used in biscuit manufacture have a puroindoline content which does not exceed 0.2% (of the dry weight of the flour). The invention also includes the use, for the preparation of biscuits, of flours having a puroindoline content greater than this value, and preferably of between 0.2 and 5%, advantageously between 0.2 and 2% of the dry weight of the flour.

The term "flour" is understood to mean not only wheat flour, but also flour from other cereals, such as rye, barley, triticale or oats, or a mixture of these flours.

It is also possible to use flours enriched with puroindolines by addition of purified puroindoline, or of a fraction rich in puroindoline, as indicated above; it is also possible to use flours obtained from varieties of cereals selected on the criterion of their richness in puroindoline, or of transgenic cereals overexpressing at least one of the isoforms of puroindoline.

The present invention also includes the biscuit doughs, as well as the biscuits which can be obtained from said flours.

The present invention will be understood more clearly with the aid of the additional description which follows, which refers to nonlimiting examples of the use of puroindoline in the preparation of various types of biscuit.

EXAMPLE 1

Incorporation of Puroindolines into the Flour

A mixture of the a and b isoforms of puroindoline was extracted and purified using the method described by BLOCHET et al. (1991, publication cited above), modified by COMPOINT et al. [Large scale and rapid purification of plant lipid binding proteins by combining TRITON X114 phase partitioning and ion exchange chromatography, Conference on Plant Proteins from European crops, Nantes, France (1996)]; the preparation obtained is freeze-dried.

The flours enriched with puroindoline are obtained by mixing the freeze-dried product, which is designated in the examples below by the term "purified puroindolines", with the flour.

For the experiments described in the examples below, the mixtures were produced, on the one hand, from flour of the type normally used in biscuit manufacture, containing about 0.1% to 0.15% of endogenous puroindolines, and on the other hand from flour not containing endogenous puroindoline. When the quantity of flour used is less than 300 g, the mixtures are produced directly in the kneader. When the quantity of flour used is greater than 300 g, the mixture is homogenized beforehand by sieving the powders (flour+puroindoline) on an 800 μm sieve.

EXAMPLE 2

Effect of the Puroindolines on a Laminated Hard Biscuit

Incorporation of the Puroindolines into the Flour
a) Flour Containing Endogenous Puroindolines The freeze-dried puroindolines and flour containing 0.15% of endogenous puroindolines are mixed in a kneader, in the proportions indicated in table 1 below.

TABLE I

| | Flour | Quantity of freeze-dried puroindolines added |
|---|---|---|
| Trial 0% | 290 g | 0 mg |
| Trial 0.05% | 290 g | 145 mg |
| Trial 0.1% | 290 g | 290 mg |
| Trial 0.2% | 290 g | 580 mg |

In parallel, control mixtures are produced by replacing the puroindolines with the same quantity of ovalbumin, which is a protein conventionally used for increasing the volume (and therefore for reducing the density) of biscuits.

b) Flour Containing no Endogenous Puroindoline

Another series of trials is carried out by adding 0.2% of purified puroindolines, or 0.2% of ovalbumin, to a flour containing no endogenous puroindoline.

For the two series of trials, the flour enriched with puroindolines or with ovalbumin is used like a conventional flour in the preparation of a laminated hard biscuit, according to the protocol indicated below.

Formula for the Laminated Hard Biscuit

The following ingredients are mixed in the proportions indicated below:

| | |
|---|---|
| Flour | 100 |
| Icing sugar | 30.00 |
| Lard | 8.00 |
| Ammonium bicarbonate | 1.00 |
| Salt | 0.63 |
| Sodium bicarbonate | 0.50 |
| Sodium pyrophosphate | 0.50 |
| Water | 26.00 |

The mixture is kneaded for 8 minutes (kneader temperature: 24° C., kneader speed: 30 rpm).

After resting for 30 minutes, the dough is laminated and cut into dough pieces with a hollow punch.

The dough pieces are baked in an oven at a temperature of 280° C. for 7 min.

Density of the Laminated Hard Biscuits

The mass, length and thickness are determined for each biscuit, and the density is calculated.

The results of trials a) are illustrated by FIG. 1, which represents the density of the biscuits as a function of the quantity of purified puroindolines (□) or of the quantity of ovalbumin (●) added to the flour (% by weight relative to the weight of the flour).

No significant difference is observed between the biscuits manufactured from flour containing 0.15% of endogenous puroindoline, and those manufactured from this same flour enriched with 0.05% of purified puroindolines. By contrast, a decrease in the density of the biscuits of the order of 3% is obtained when the biscuits are manufactured from flour containing 0.15% of endogenous puroindoline enriched with 0.1% or 0.2% of purified puroindolines.

Figure 2:
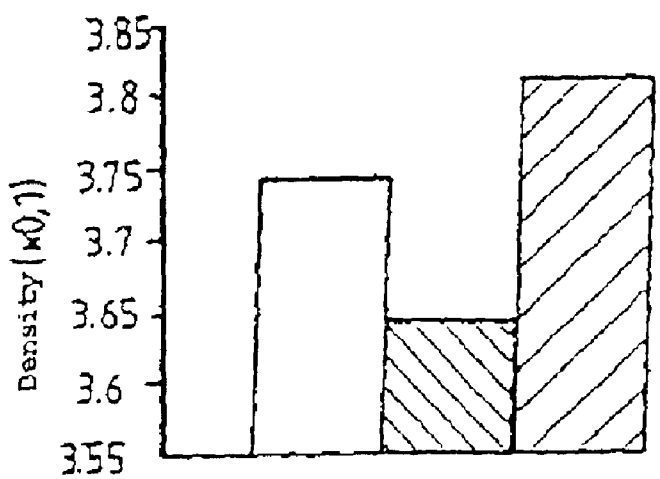
FIG. 2.

The results of trials b) are illustrated by FIG. 2, which represents the density of the biscuits obtained from a flour containing no endogenous puroindoline, with no additive, or supplemented with 0.2% (by weight relative to the weight of the flour) of purified puroindolines, or of ovalbumin.

Legend to FIG. 2:
Flour with no additive:□
Flour+0.2% puroindoline:▩
Flour+0.2% ovalbumin:▨

The results of the two series of trials show hat the addition of puroindoline induces a decrease in the density of the biscuits which is markedly greater than that induced by ovalbumin.

EXAMPLE 3

Effect of the Puroindolines on a Soft Biscuit

The biscuits are made according to the formula (% by weight) indicated in table II below:

TABLE II

| FLOUR | 30% |
|---|---|
| SUGAR | 30% |
| EGGS | 4.5% |
| FAT | 10% |
| GLYCERIN | 4% |
| WATER | 18% |
| WHEY | 2% |
| BAKING POWDERS | 1.1% |
| SALT | 0.4% |
| LECITHIN | 0.4% |

Three different flours are used: a flour containing no puroindoline (control 0% of puroindoline), the same flour to which 0.1% by weight of purified puroindolines relative to the weight of flour is added and a flour containing 0.1% of endogenous puroindolines (control endogenous puroindoline).

For the production of flour enriched with puroindoline the flour is sieved with the puroindolines using an 800 μm sieve. This enriched flour is then sieved again with the rest of the powders immediately before use.

These powders are respectively: baking powders, salt, lecithin, sugar, powdered eggs. They are weighed in the same container and mixed with the flour immediately before use.

Mixing with the liquid ingredients is then carried out and the baking is carried out for 10 min at 180° C.

Figure 3:
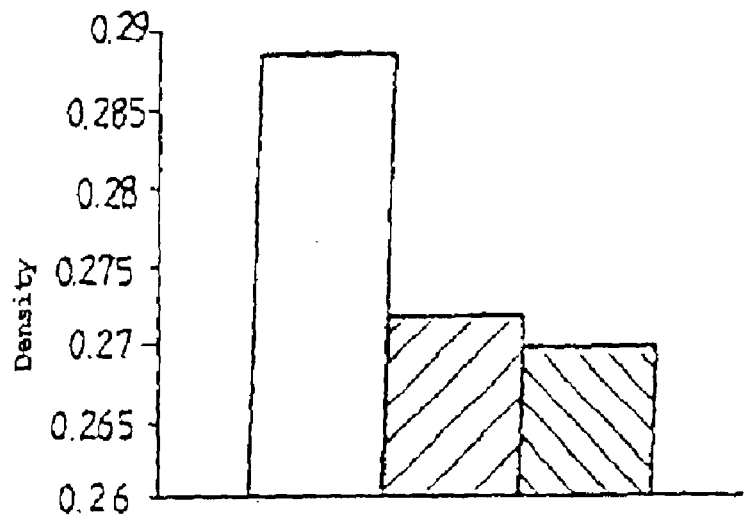
FIG. 3.

The density of the biscuits obtained and the variation of their texture during storage are measured. The measurements are carried out according to the following protocols:
Density:
Slices 2 cm in diameter are cut out in the biscuit with a hollow punch and weighed. The density is determined according to the following formula:

$$Density = m/(w*r^2h/10)$$

m=mass
r=radius
h=height of the slices.
Texture:
The texture is measured with the aid of an INSTRON penetrometer; a roll, cut out in the biscuit to be tested, is compressed at a constant rate. The force-movement of compression curve is characteristic of the sample studied. The measurement of the mean force necessary to compress the product makes it possible to determine its firmness.
The measurement parameters are the following:
modulus of compression: roll 2.5 cm in diameter
distance between the plates: 15 mm
rate of traverse: 40 mm/mm
measurement load at origin HO: 0.1 N
minimum safe load: 100 N
maximum (safe) movement: 13
initial compression 0%
final compression: 50%
peak detection criterion: 0.1 N
max. default value 1: 25%
Results:
Density
The results are illustrated by FIG. 3. Legend to FIG. 3:
Flour containing 0.1% of endogenous ▨puroindoline:
Flour without endogenous puroindoline:□
Flour without endogenous puroindoline: +0.1% puroindolines:▧

Figure 4:
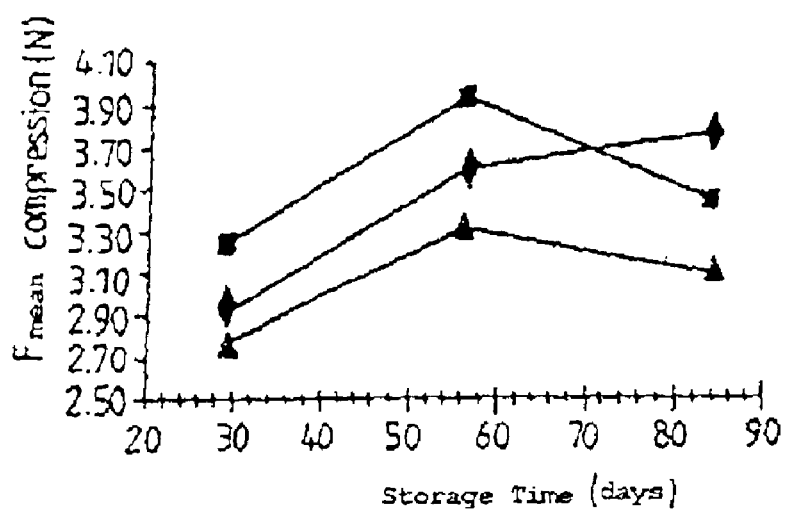
FIG. 4.

The biscuits obtained from flour having no endogenous puroindoline are more dense than the biscuits manufactured from flour containing 0.1% of endogenous puroindoline. The addition of 0.1% of purified puroindolines to flour containing no endogenous puroindoline causes a decrease of about 6% in the density of the biscuit; the soft biscuits obtained in this manner have a density similar to that of the biscuits obtained from flour containing 0.1% of endogenous puroindoline. Texture The results are illustrated by FIG. 4 which represents the variation of the mean force (Fmean) over time, for the biscuits obtained from the various flours tested; flour containing 0.1% of endogenous puroindoline (▲); flour without endogenous puroindoline (♦); flour without endogenous puroindoline supplemented with 0.1% (by weight relative to the weight of the flour) of purified puroindolines (∪).

These results show that the addition of puroindoline has a significant effect on the texture of the biscuit. The biscuits obtained from the flour without endogenous puroindoline supplemented with purified puroindolines have a firmer texture after 29 and 56 days of storage than the biscuits obtained from flour containing 0.1% of endogenous puroindoline, or from the flour without endogenous puroindoline. From 80 days of storage (which is more than the period normally separating the manufacture of the product from its consumption), the difference in texture between the products is no longer significant.

EXAMPLE 4

Effect of Puroindolines on a Puff Biscuit

The biscuits are made according to the formula indicated in table III below:

TABLE III

|  | In % | In grams |
|---|---|---|
| Flour | 35 | 500 |
| Granulated sugar | 35 | 500 |
| Liquid whole eggs | 30 | 450 |

Two different flours are used: a flour containing no endogenous puroindoline, and the same flour enriched with 0.1% by weight of purified puroindolines relative to the weight of the flour.

The biscuit dough thus obtained contains about 4% of fatty substances provided by the eggs and the flour.

Figure 5:
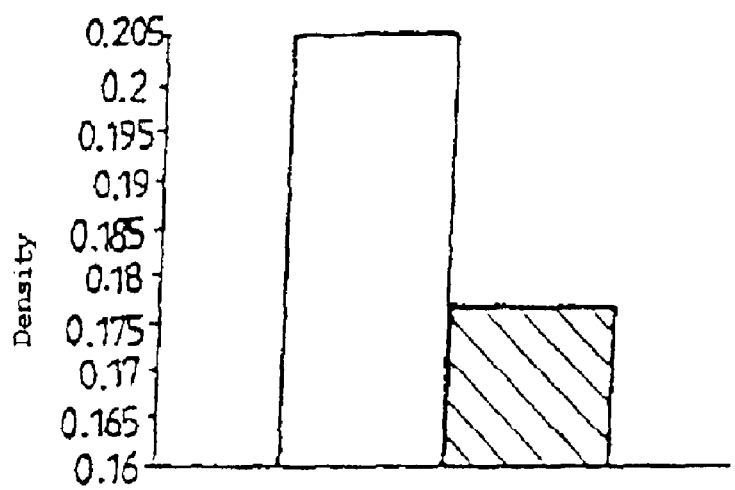
FIG. 5.

The density and the texture of the biscuits obtained are measured as indicated in example 3 above.
Results
Density
The results are illustrated by FIG. 5. Legend to FIG. 5:
Flour without endogenous puroindolines:□
Flour without endogenous puroindolines +0.1% puroindolines:▧

Figure 6:
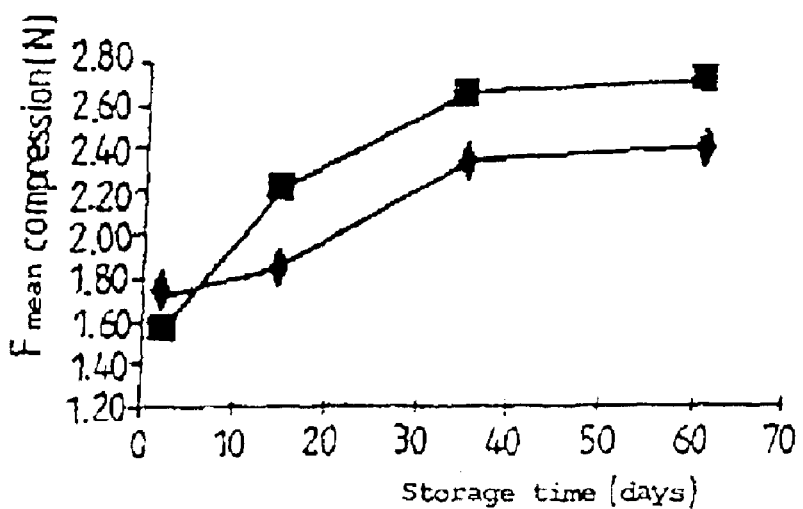
FIG. 6.

These results show that the addition of 0.1% of purified puroindolines causes a decrease of 14% in the density of the biscuits.
Texture
The results are illustrated by FIG. 6 which represents the variation in the mean force (Fmean) during storage, for the biscuits obtained from flour with no endogenous puroindoline (♦), or from flour with no endogenous puroindoline, supplemented with 0.1% (by weight relative to the weight of the flour) of purified puroindolines (■).

The puff biscuits containing purified puroindolines possess a firmer texture, which results in a firmness greater than 13%, at 61 days of storage. This effect is greater than that, described in Example 3, observed in the case of soft biscuits.

EXAMPLE 5

Effect of Puroindolines on a Puff Biscuit Containing 3% of Rapeseed Oil

Incorporation of the Puroindolines into the Flour
The biscuits are made according to the formula indicated in table IV below:

TABLE IV

|  | In % | In gram |
|---|---|---|
| Flour | 33.5 | 500 |
| Rapeseed oil | 3 | 50 |
| Granulated sugar | 33.5 | 500 |
| Liquid whole eggs | 30 | 450 |

Two different flours are used: a flour containing no endogenous puroindoline, and the same flour enriched with 0.1% of purified puroindolines.

The rapeseed oil is added before the overrun stage.

The biscuit dough thus obtained contains about 7% of fatty substances, making into account those provided by the eggs and the flour.

Figure 7:
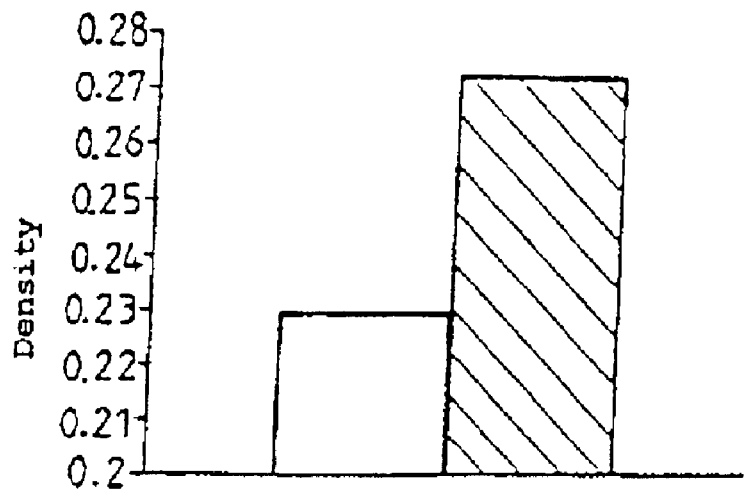
FIG. 7.

The density and the temperature of the biscuits obtained are measured as indicated in Example 3 above. Density
The results are illustrated by FIG. 7. Legend to FIG. 7:

Flour without endogenous puroindolines:☐

Flour without endogenous puroindolines +0.1% puroindolines:▨

The addition of 0.1% of purified puroindolines to the flour containing no endogenous puroindoline results in a significant increase, of the order of 20%, in the density of the biscuits.

Texture

Figure 8:
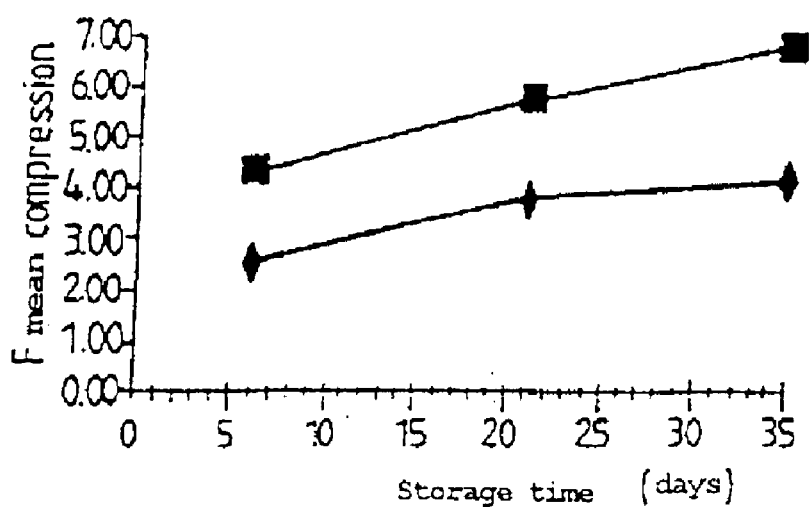
FIG. 8.

The results are illustrated by FIG. 8 which represents the variation in the mean force ($F_{mean}$) during storage, for the biscuits obtained from flour without endogenous puroindoline (♦), or from flour without endogenous puroindoline, supplemented with 0.1% (by weight relative to the weight of the flour) of purified puroindolines (■).

The biscuits obtained from the flour supplemented with puroindolines have, at 35 days of storage, a firmness 65% greater than that of the biscuits obtained from the flour without puroindoline.

The results obtained show that the effect of the puroindolines on the density of the puff biscuits depends on the fat content of the formula. It is thus possible to use puroindolines to decrease or on the contrary to increase the density of this type of product, according to its fat content.

The effect of the puroindolines on the texture also appears to be linked to the fat content; however, it is always in the same direction, that is to say toward an increase in firmness.

What is claimed is:

1. A method of making soft or puff dough biscuits from a dough comprising flour and additional ingredients providing proteins, carbohydrates, and lipids, wherein the improvement comprises admixing the dough with at least one puroindoline;

and wherein the at least one puroindoline is added in an amount effective for increasing the firmness of the biscuits resulting from baking the dough.

2. The method of claim 1 wherein the amount of puroindoline added is effective to reduce the density of a soft biscuit prepared from a dough with a fat content of between 2 and 30% of the total weight of the dough.

3. The method of claim 1 wherein the amount of puroindoline added is effective to reduce the density of a puff biscuit prepared from a dough with a fat content less than or equal to 4% of the total weight of the dough.

4. The method of claim 1 wherein the amount of puroindoline added is effective to increase the density of a puff biscuit prepared from a dough without added emulsifier and which dough has a fat content greater than or equal to 7% of the total weight of the dough.

5. A method of making soft or puff dough biscuits from a mixture comprising flour and additional ingredients providing proteins, carbohydrates, and lipids, wherein the improvement comprises admixing the flour with at least one puroindoline;

and wherein the at least one puroindoline is added in an amount effective for increasing the firmness of the biscuits resulting from baking the mixture.

6. The method of claim 5 wherein the amount of puroindoline added is between 0.02 and 5% by weight relative to the weight of the flour.

7. The method of claim 5 wherein the flour has a puroindoline content greater than 0.2% of the dry weight of the flour with the additional ingredients.

8. The method of claim 7 wherein the puroindoline content of the flour is between 0.2 and 2% of the dry weight of the flour.

9. A method of making non-puff dough biscuits from a dough comprising flour and additional ingredients providing proteins, carbohydrates, and lipids, wherein the improvement comprises admixing the dough with at least one puroindoline;

and wherein the at least one puroindoline is added in an amount effective for reducing the density of the biscuits resulting from baking the dough.

10. The method of claim 9 wherein the amount of puroindoline added is effective to reduce the density of a hard biscuit prepared from a dough with a fat content of between 2 and 20% of the total weight of the dough.

11. The method of claim 9 wherein the amount of puroindoline added is effective to reduce the density of a biscuit prepared from a dough with a fat content of between 2 and 30% of the total weight of the dough.

12. A method of making non-puff dough biscuits from a mixture comprising flour and additional ingredients providing proteins, carbohydrates, and lipids, wherein the improvement comprises admixing the flour with at least one puroindoline;

and wherein the at least one puroindoline is added in an amount effective for reducing the density of the biscuits resulting from baking the mixture.

13. The method of claim 12 wherein the amount of puroindoline added is between 0.02 and 5% by weight relative to the weight of the flour.

14. The method of claim 12 wherein the flour has a puroindoline content greater than 0.2% of the dry weight of the flour with the additional ingredients.

15. The method of claim 14 wherein the puroindoline content of the flour is between 0.2 and 2% of the dry weight of the flour.

* * * * *